Dec. 16, 1952

W. A. WILL 2,621,649

DAMPER CONTROL UNIT

Filed Sept. 23, 1948

INVENTOR
WILBERT A. WILL
BY
Dicke & Padlon
ATTORNEYS

Patented Dec. 16, 1952

2,621,649

UNITED STATES PATENT OFFICE 2,621,649

DAMPER CONTROL UNIT

Wilbert A. Will, New Bremen, Ohio, assignor to Crown Controls Company, Inc., New Bremen, Ohio, a corporation of Ohio Application September 23, 1948, Serial No. 50,829

1 Claim. (Cl. 126—286)

This invention relates to a new and improved damper control unit and has for an object to provide such a device in which the damper motor proper and the pulley or pulleys for one or two chains for operating the usual draft and/or check dampers of a solid fuel burning furnace or the like are mounted on a single panel, whereby, when the panel is mounted on a wall or a floor joist, the pulleys are simultaneously and automatically mounted in proper relation to the damper motor proper and its usual chain operating cranks.

Another object of this invention is to provide such a device in which not only the damper motor and pulleys are thus mounted but in which the usual transformer for furnishing power to said damper motor is also mounted on the panel or on a member mounted on the panel, such as the damper motor itself. This has the further advantage that the electrical connections from the transformer to the damper motor may be made in the factory, thus further simplifying the installation of the damper control unit.

Other objects and advantages of this invention will be apparent from consideration of the specification as illustrated by the accompanying drawings of possible embodiments of the invention, in which drawings.

Figures 1, 2, 3:
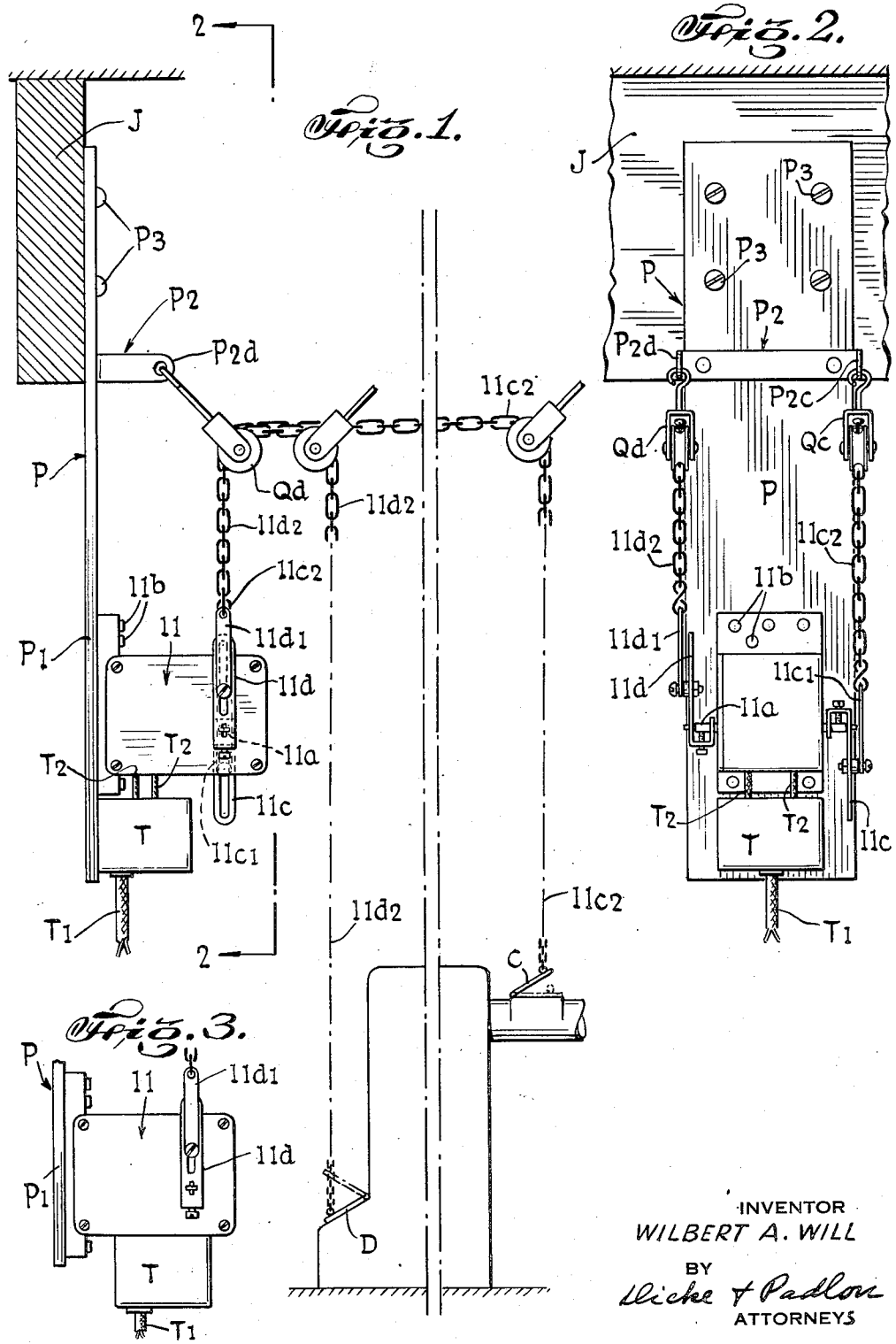
Fig. 1 is a side view of such a damper control unit, shown attached to a floor joist, and connected through chains to the draft and check dampers of a furnace (shown on reduced scale); and with the parts between the dotted vertical lines omitted.
Fig. 2 is a front view of the unit of Fig. 1, partly in section, taken on the line 2—2 of Fig. 1.
Fig. 3 is a partial view, similar to Fig. 1, the transformer being shown attached to the damper motor proper.

Referring to said drawings, the numeral 11 designates generally a damper motor, which may be of usual construction and having an operating shaft 11a upon the opposite ends of which are carried crank arms 11c and 11d, respectively. These crank arms may be of usual construction and preferably have links 11d1 and 11c1 pivoted thereto at an adjustable distance from the shaft 11a. Said links are shown connected to chains 11d2 and 11c2, respectively. The damper motor 11 is also provided with the required number of electric connection terminals 11b for connecting the damper motor to its control instrument, such as a room thermostat, and/or a limit control instrument.

The parts so far described are standard construction, except that the connection terminals 11 in former constructions must include two for connecting the usual transformer thereto. The damper motor may be of any desired construction, old or new, but it will be assumed for the purposes of this application that the shaft 11a will make a half revolution upon the attainment of a certain condition at the control instrument and will rotate another half turn (in the same direction or reversely) upon the attainment of another condition at the control instrument.

This change of position of shaft 11a was transmitted through chains such as 11c2 and 11d2 to check damper and draft dampers, respectively, such as the dampers C and D. Suitable pulleys for the chains had to be provided and mounted for support in just the right location relative to the damper motor and to the dampers to achieve proper results. Furthermore, a suitable plane had to be found for the usual step-down transformer used with such devices and such transformer had to be connected to the usual power supply lines and its output side connected properly to the damper motor proper.

Hundreds of thousands of such devices have been made, sold, and installed, and for many years it has been realized that the installation of such devices was difficult, cumbersome and time-consuming, and required great skill and experience. It happened frequently that if a place was found for mounting the damper motor proper there was no place available to mount the pulleys in proper relation to the cranks of the damper motor (or vice versa). Also, it was necessary to provide a suitable place for the transformer. The three required conditions: (1), a proper place for mounting the motor, (2), a proper place for mounting the pulleys in the right relation to the motor cranks, and (3), a suitable place for the transformer, were seldom found together and it was found necessary to improvise, as by nailing a board to a joist for supporting the motor and then nailing another board or two to several joists to mount the pulleys. Sometimes a third board was required for mounting the transformer.

In spite of these great difficulties widely known for many lears, these problems were not solved. It is an object of the present invention to solve these problems.

To accomplish the desired result, I provide a panel, P, preferably made of steel and preferably of about the dimensions shown in relation to the usual damper motor. The panel P is preferably formed with its longitudinal edges P1 flanged over or beaded, to provide additional strength. The damper motor 11 is attached to said panel as by fastenings passing through the panel. At a suitable distance above the motor the panel carries a bracket P2 which preferably consists of a central section P2a and two forwardly extending arms P2c and P2d which serve to support, respectively, pulley Qc and pulley Qd, respectively, for the chains 11c2 and 11d2, respectively. It will be noted that the pulleys are so mounted that the chains will be substantially parallel to the crank arms when they are in one of their fully-operated positions, and far enough above the damper motor to give proper crank action, and only far enough above the motor to have the horizontal part of the chains able to clear the bottom edges of other joists. This proper location of pulleys Qc and Qd is rather critical and was seldom attainable by the installer heretofore.

The transformer T, if used, is also preferably carried by the panel P, either by being mounted directly thereon, as in Figs. 1 and 2, or by being mounted on the damper motor proper, as in Fig. 3. T1 indicates the power supply connection to the primary of the transformer and may be an ordinary cord with connecting plug for insertion into a suitable outlet or receptacle. The secondary conductors T2 are visible only in Figs. 1 and 2 and not in the form of Fig. 3.

P3 indicate nails or screws passing through holes pierced into the panel near its upper end and into a floor joist J, or other suitable support.

The brackets P2c and P2d, and the pulleys Qc and Qd, as well as the damper motor 11 and the transformer T, if used, are assembled onto the panel with the required electrical connections in the factory. To make the necessary installation the installer merely selects a suitable joist (or side wall) and nails the panel in place as by nails P3. This serves to locate and support the motor and the transformer (if used) and also serves to mount the pulleys Qc and Qd in exactly the right position in relation to the damper motor crank arms and also in the best relation to the various joists.

Thus, I have provided as a unitary article of manufacture a device which includes a damper motor proper, a panel for supporting it, a transformer also supported by the panel, pulleys and means for supporting the pulleys on said panel in just the right relationship to said damper motor.

In the particular embodiments shown and described, two chain actuating cranks and two chains have been provided. It is to be understood that in some cases only one crank and one chain are used. This is particularly true where the furnace is provided with a beam pivoted between its ends and chains are provided at each end for operating the draft damper and check damper, respectively. In such cases it is possible to use only one crank and one chain which is connected to the beam in such a way that when the chain is tensioned the beam is rocked to close the draft and open the check damper. Such beams are customarily provided with means which, upon the attainment of a certain steam pressure or a certain temperature of the heating medium, will rock the beam to close the draft damper and open the check damper.

Another feature of the present invention is that the unitary construction frequently permits its installation directly over the furnace so that the secondary pulley or pulleys may be eliminated. In such case the unit may be installed without any pulleys other than those which are a part of the unit, thus further simplifying the installation.

It will be noted that the constructions shown and described will serve admirably to accomplish the objects stated above. It is to be understood, however, that the constructions disclosed above are intended merely as illustrative of the invention, and not as limiting, as various modifications therein may be made without departing from the invention as defined by a proper interpretation of the claim which follows.

I claim:

As a unitary article of manufacture the combination of which comprises an elongated support panel having means at one end for attaching it to a support, a damper motor provided with chain actuating means mounted upon said panel adjacent to the other end thereof, an arm outwardly extending and carried by said panel on the same side thereof as the motor, said arm being in spaced relationship to said motor, a link pivotally mounted to said arm, said link carrying a pulley, said pulley being located substantially in the same plane as the chain actuating means of the motor, a damper operating chain, said chain being attached to said actuating means and actuated by the motor, and being trained over said pulley.

WILBERT A. WILL.

REFERENCES CITED

The following references are of record in the file of this patent:

UNITED STATES PATENTS

| Number | Name | Date |
|---|---|---|
| 379,395 | Higgins | Mar. 13, 1888 |
| 1,063,780 | Culver | June 3, 1913 |
| 1,865,641 | Persons | July 5, 1932 |
| 1,996,237 | Folds | Apr. 2, 1935 |